(12) United States Patent
Church et al.

(10) Patent No.: US 10,647,282 B2
(45) Date of Patent: May 12, 2020

(54) VEHICLE VISION SYSTEM WITH UNDERCARRIAGE CAMERAS

(71) Applicant: Magna Electronics Inc., Auburn Hills, MI (US)

(72) Inventors: Theodore J. Church, Ortonville, MI (US); Clarence P. McElroy, Grand Blanc, MI (US); Timothy M. Phillips, Fenton, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/177,540

(22) Filed: Nov. 1, 2018

(65) Prior Publication Data

US 2019/0135216 A1 May 9, 2019

Related U.S. Application Data

(60) Provisional application No. 62/581,937, filed on Nov. 6, 2017.

(51) Int. Cl.
| | |
|---|---|
| *B60R 21/015* | (2006.01) |
| *G08G 1/16* | (2006.01) |
| *H04N 7/18* | (2006.01) |
| *B60R 1/00* | (2006.01) |
| *B60R 11/04* | (2006.01) |
| *B60R 1/10* | (2006.01) |

(52) U.S. Cl.
CPC .......... *B60R 21/01538* (2014.10); *B60R 1/00* (2013.01); *G08G 1/167* (2013.01); *H04N 7/18* (2013.01); *H04N 7/183* (2013.01); *B60R 1/105* (2013.01); *B60R 11/04* (2013.01); *B60R 2300/303* (2013.01)

(58) Field of Classification Search
CPC ............... B60R 21/01538; B60R 1/00; B60R 2300/303; B60R 1/105; B60R 11/04; H04N 7/183; H04N 7/18; G08G 1/167
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 6,690,268 | B2 | 2/2004 | Schofield et al. |
| 7,038,577 | B2 | 5/2006 | Pawlicki et al. |
| 7,581,859 | B2 | 9/2009 | Lynam |
| 7,720,580 | B2 | 5/2010 | Higgins-Luthman |
| 7,855,755 | B2 | 12/2010 | Weller et al. |
| 9,297,755 | B2 | 3/2016 | Renno |

(Continued)

*Primary Examiner* — Ryan W Sherwin
(74) *Attorney, Agent, or Firm* — Honigman LLP

(57) ABSTRACT

A vision system for a vehicle includes at least one underbody camera disposed at an underside of a vehicle and having a field of view encompassing a ground surface under the vehicle and being traveled on by the vehicle. The underbody camera captures image data as the vehicle is moving. A control includes an image processor that processes image data captured by the underbody camera. The control, responsive to processing of image data captured by the underbody camera, detects an object under the vehicle that is greater than a threshold height. The control, responsive to detection of the object, generates an output to inform a driver of the vehicle of the detected object under the vehicle.

18 Claims, 3 Drawing Sheets

View Direction

(56) References Cited

U.S. PATENT DOCUMENTS

| | | | |
|---|---|---|---|
| 9,304,081 B2 | 4/2016 | Renno | |
| 9,491,451 B2 | 11/2016 | Pliefke | |
| 9,904,857 B2* | 2/2018 | Lee | G06K 9/00805 |
| 2013/0222573 A1* | 8/2013 | Onuma | E02F 9/24 |
| | | | 348/82 |
| 2014/0169627 A1* | 6/2014 | Gupta | B60R 1/00 |
| | | | 382/103 |
| 2015/0210274 A1* | 7/2015 | Clarke | B60K 31/00 |
| | | | 382/104 |
| 2016/0119587 A1* | 4/2016 | Tan | B60R 1/00 |
| | | | 348/148 |
| 2016/0253566 A1* | 9/2016 | Stein | G06K 9/00791 |
| | | | 348/148 |
| 2016/0325682 A1 | 11/2016 | Gupta et al. | |
| 2017/0320437 A1* | 11/2017 | Liebau | G01S 17/023 |
| 2017/0372147 A1* | 12/2017 | Stervik | B60R 1/00 |
| 2018/0321142 A1 | 11/2018 | Seifert | |

* cited by examiner

VEHICLE VISION SYSTEM WITH UNDERCARRIAGE CAMERAS

CROSS REFERENCE TO RELATED APPLICATION

The present application claims the filing benefits of U.S. provisional application Ser. No. 62/581,937, filed Nov. 6, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes a plurality cameras to capture image data representative of images exterior of the vehicle, and provides undercarriage cameras to capture image data representative of obstacles, rough terrain, drop-offs or the like at or near the vehicle (and/or a trailer towed by the vehicle). The system may process captured image data to detect obstacles or rough terrain or the like, and/or the system may display images derived from the captured image data to display the area under the vehicle to the driver operating the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
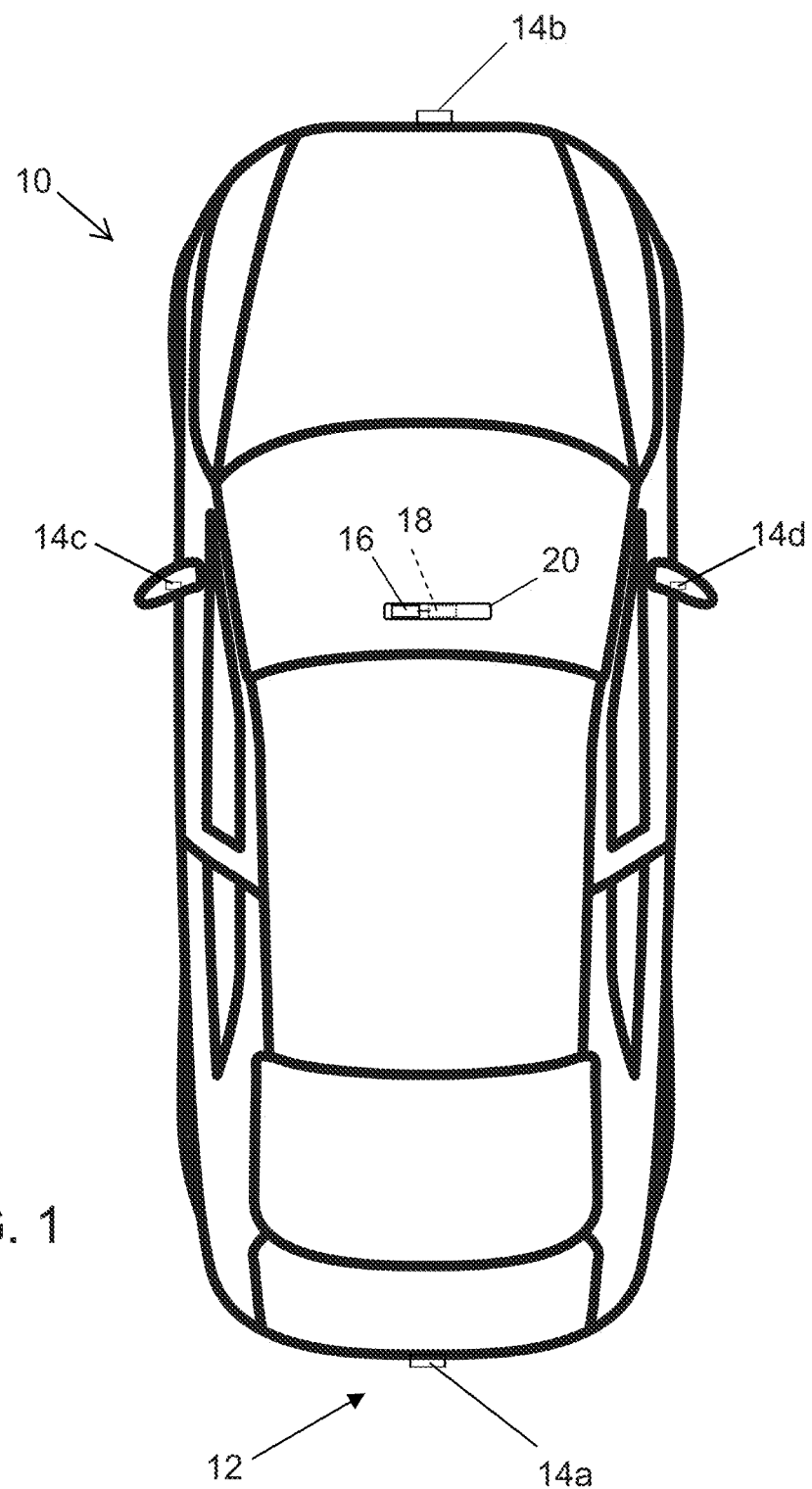
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

With the exterior surround view cameras of FIG. 1, there is limited or no view under the vehicle carriage, trailer carriage or at the tire location. Thus, no driver warning is provided of objects or hazards (such as rocks or rough terrain or such as any object that may be present on a road surface) under the vehicle. Such surround view camera systems do not allow driver to view obstacles, rough terrain, drop-offs under the vehicle/trailer at or near the vehicle/trailer tires. The surround view systems do not detect objects or hazards under the vehicle.

The vision system of the present invention provides auxiliary undercarriage cameras that capture image data of the area(s) underneath the vehicle and/or trailer so as to allow the driver of the vehicle to view images derived from the image data captured by the undercarriage cameras. For example, the system may provide the driver with a rearward view of the front tires and a forward portion of the undercarriage (by displaying images derived from image data captured by camera A in FIG. 2). The camera A is disposed at the front of the vehicle below the front bumper and has a field of view rearward of the bumper and underneath the vehicle. Optionally, for example, the system may provide the driver with a forward view of the front tires and the forward portion of the undercarriage (by displaying images derived from image data captured by camera B in FIG. 2).

The camera B is disposed at a generally middle region or under the mid-point of the vehicle carriage and views forward and downward therefrom. Optionally, for example, the system may provide the driver with a rearward view of the rear tires and of a rearward portion of the undercarriage (by displaying images derived from image data captured by camera C in FIG. 2). The camera C is disposed at a generally middle region or under the mid-point of the vehicle carriage and views rearward and downward therefrom. The cameras A, B, C, D are disposed generally along a longitudinal centerline of the vehicle, with the cameras B, C disposed rearward of the front wheels of the vehicle and forward of the rear wheels of the vehicle. Optionally, for example, the system may provide the driver with a forward view of the rear tires and of the rearward portion of the undercarriage (by displaying images derived from image data captured by camera D in FIG. 2). The camera D is disposed at the rear portion of the vehicle and below the rear of the carriage or rear bumper of the vehicle and views downward and at least forward of the rear bumper to view beneath the vehicle at the rear of the vehicle.

The system may operate to display the under-vehicle images responsive to a trigger or user input or the like. For example, a driver may actuate a user input so the display displays images derived from image data captured by the undercarriage camera(s), such as while driving over rough terrain or the like. Optionally, the system may automatically display images derived from image data captured by the undercarriage camera(s) responsive to detection of an object (such as an object greater than a threshold size or height), such as rocks or rough terrain or the like (such as via processing of image data captured by one or more undercarriage cameras). For example, if the system detects a large object (greater than a threshold height or size, such as an object having a height of greater than, for example, 4 inches or 8 inches or 12 inches, depending on the particular application of the system, and optionally depending on the ground clearance for that vehicle) and/or detects rough terrain that is at a threshold level of roughness or variations (such as changes in height of the terrain that are greater than a threshold height over a predetermined distance, such as a change in height of, for example, a six inch rise or fall in height over a six inch distance or 10 inch rise or fall in height over a 12 inch distance or the like), the system may automatically display images so the driver of the vehicle is aware of the detected object/terrain and can react or adjust driving accordingly. Optionally, responsive to detection of a sufficiently large object or sufficiently large change in terrain, the control may control the vehicle (such as steering and/or braking of the vehicle) to avoid or mitigate impact with the detected object or terrain change.

Optionally, the display device may display video images derived from image data captured by one or more underbody cameras, such as responsive to actuation of a user input in the vehicle, so that the driver of the vehicle, as the vehicle is approaching an object or rough terrain, can actuate the display device to view the object(s) from underneath the vehicle to see if the objects/terrain are below the ground clearance of the vehicle. The control may generate an alert responsive to determination that an object or terrain may impact the underside of the vehicle (i.e., has a height greater than the ground clearance of the vehicle). The alert may comprise an audible or visual alert, and may comprise an electronically generated graphic overlay at the displayed images, such as a graphic overlay that highlights the detected object (such as by coloring it red or flashing the displayed image or otherwise demarcating the object or displayed images to draw the driver's attention to a potential hazard).

Optionally, the system may include trailer-mounted cameras that are mounted at an undercarriage of a trailer that is being towed by the vehicle. When the trailer is connected or hitched to the vehicle, the trailer cameras may communicate with (either via a wire or communication bus or via wireless communication) with a controller of the vehicle.

Figure 2:
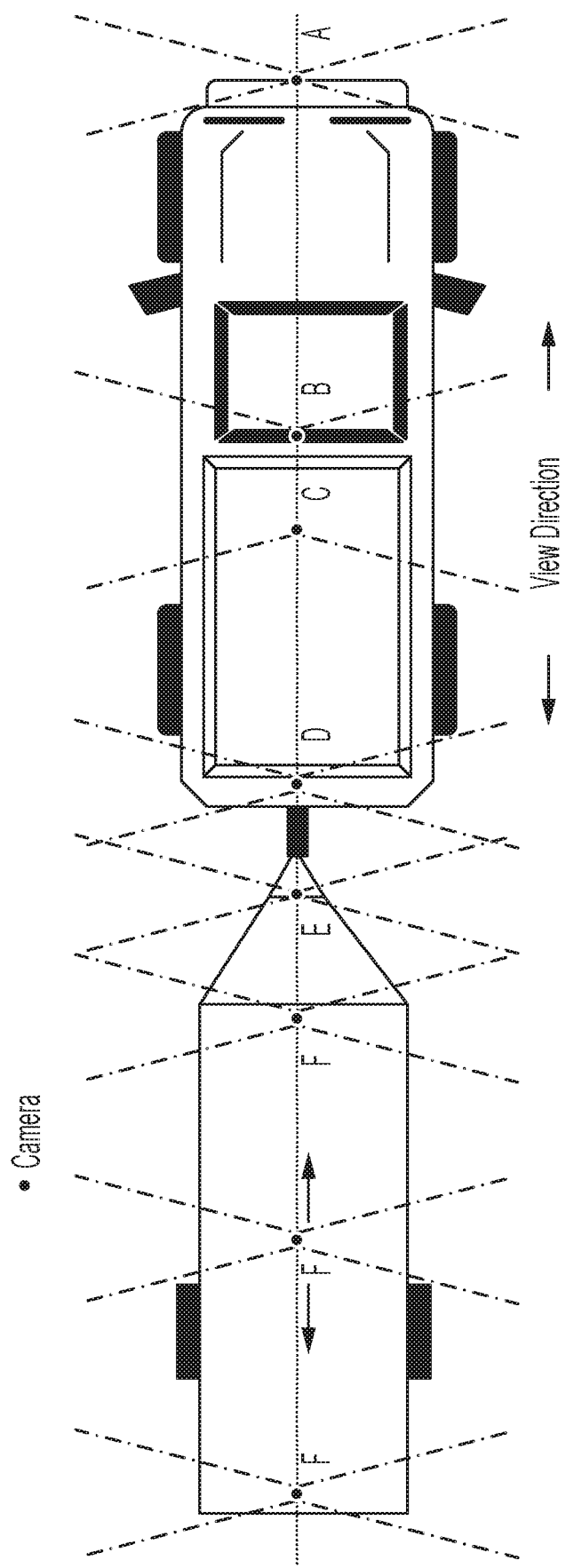
FIG. 2 is a plan view of the vehicle, shown towing a trailer, and shown with undercarriage cameras at the vehicle and trailer in accordance with the present invention.
Figure 3:
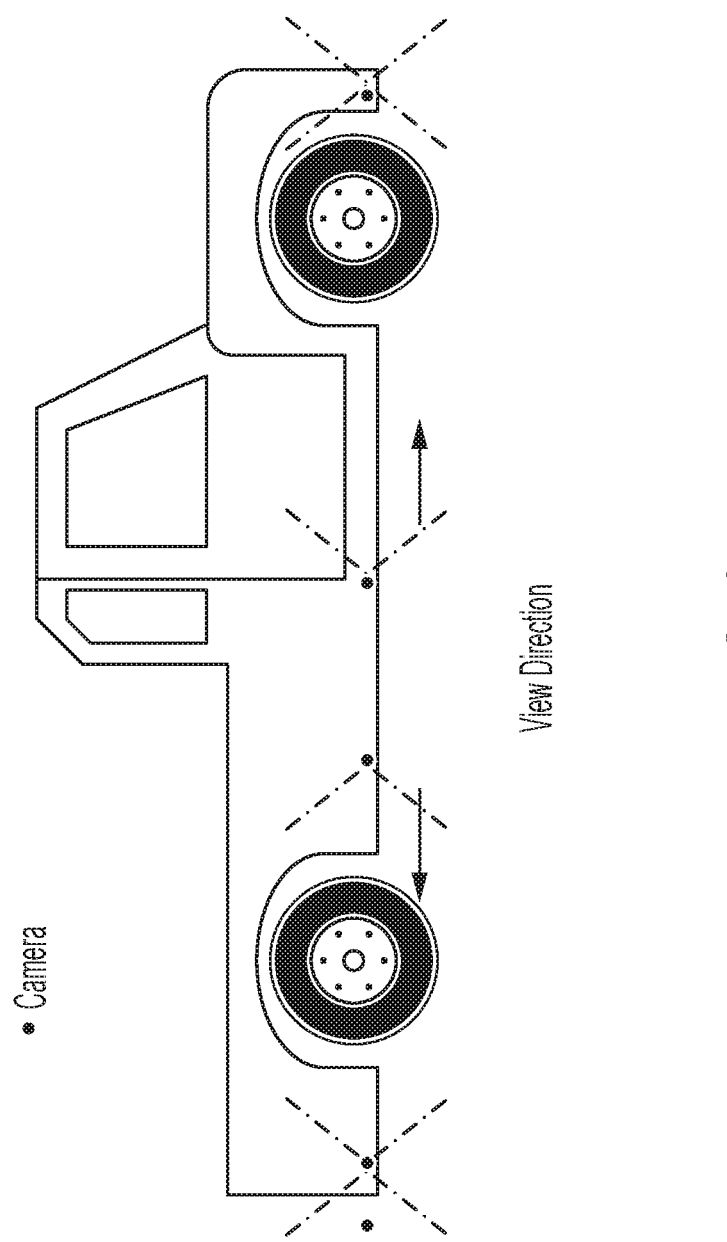
FIG. 3 is a side elevation of the vehicle of FIG. 2.

When the trailer is connected to the vehicle, the system may, for example, provide the driver with a forward view of the trailer bottom and/or the trailer hitch area (by displaying images derived from image data captured by camera E in FIG. 2). The camera E may be disposed at and under the trailer hitch, and/or at and under a middle region of the trailer, and/or at and under and forward or rearward of a trailer axle and/or at and under a rear portion of the trailer and/or at any driver selected or customized location (such as any of the locations of cameras F in FIG. 2, with the viewing direction forward). Optionally, the system may, for example, provide the driver with a rearward view of the trailer bottom and/or the trailer hitch area (by displaying images derived from image data captured by one or more of cameras F in FIG. 2). The trailer camera(s) may be disposed at and under the trailer hitch, and/or at and under a middle region of the trailer, and/or at and under and forward or rearward of a trailer axle and/or at and under a rear portion of the trailer and/or at any driver selected or customized location (such as at any of the locations of cameras E and F in FIG. 2).

Optionally, the system may provide or display images to the driver of a top view of the ground area under the vehicle (and/or trailer), with the displayed images derived from image data captured by multiple cameras mounted under the vehicle (and/or trailer), with the image data stitched or merged to form a composite image or top down view of the ground area under the vehicle and/or trailer. The system may process image data captured by multiple cameras mounted under the vehicle (and/or trailer) to perform object detection (via camera machine vision) and/or may operate in conjunction with one or more ultrasonic, radar or lidar sensors mounted under the vehicle (and/or trailer). The system may, responsive to processing of captured image data and/or responsive to under-vehicle ultrasonic or radar or lidar sensors, generate a driver warning based on objects detected under the vehicle. Optionally, the system may provide control of the steering and/or braking of the vehicle to avoid objects detected under the vehicle and may provide automatic braking based on objects detected under the vehicle.

Optionally, the system may stitch or merge image data to provide various combined views for displaying at a display screen in the vehicle for viewing by the driver of the vehicle. For example, the system may stitch image data captured by a rearward viewing camera (such as camera 14a in FIG. 1) with one or more underbody cameras A, B, C, D to mitigate or eliminate blind spots of the area immediately adjacent to or under the vehicle. Optionally, for example, the system may stitch image data captured by a rearward viewing camera (such as camera 14a in FIG. 1) with one or more underbody cameras A, B, C, D, E, F to provide enhanced views during trailer backup maneuvering. Optionally, for example, the system may stitch image data captured by the surround view cameras (such as cameras 14a, 14b, 14c, 14d in FIG. 1) with one or more underbody cameras A, B, C, D to provide enhanced 360 degree viewing (including the areas immediately adjacent to and/or under the vehicle). Optionally, for example, the system may stitch image data captured by a forward viewing camera (such as camera 14b in FIG. 1) with one or more underbody cameras A, B, C, D, such as to provide enhanced viewing for off road driving purposes. Optionally, for example, the system may utilize or process image data captured by the underbody cameras for intelligent driving and object detection and determination of ground clearance and/or the like.

The system may also provide additional features on the displayed images. For example, the system may generate a vehicle footprint overlay or a trailer footprint overlay, and may allow the user to input the trailer dimensions and axle location(s) and the like so as to provide an accurate or enhanced overlay of the trailer overlayed on the displayed ground images captured by the undercarriage cameras and under trailer cameras and the surround view cameras.

Optionally, the system may operate in a low power mode where the camera(s) may be deactivated under certain driving conditions (such as, for example, highway driving conditions where the undercarriage views are not needed). Optionally, the system may utilize LED backlighting (via energizing one or more light emitting diodes or LEDs, such as visible light emitting LEDs or near infrared light emitting LEDs) and/or night vision incorporated into the undercarriage camera (s). The system may use two or more cameras for range/distance determination of objects present in the fields of views of the two or more cameras.

Optionally, the system may provide a cylindrical view display, which can be panned or adjusted using the surround view camera(s) and/or the underbody camera(s). Optionally, the system may provide a spherical view display, which can be panned or adjusted using the surround view camera(s) and/or the underbody camera(s). Optionally, the system may provide a panoramic view display using the surround view camera(s) and/or the underbody camera(s). The view or display selection may be based on object detection and/or clearance detection (as detected via processing image data captured by one or more of the surround view cameras and/or the undercarriage cameras.

The system may detect objects or ground clearance via processing of captured image data or via sensing via one or more underbody ultrasonic sensors, lidar sensors or radar sensors. Optionally, the system may also utilize a forward viewing camera mounted on top of the vehicle (such as at the top of a cab of a pickup truck or the like) for object/clearance detection ahead and above the vehicle (such as for determining clearance for the vehicle to pass through a tunnel or under a low bridge and/or the like).

Thus, the system of the present invention provides a plurality of underbody or undercarriage cameras that capture image data representative of the area under the vehicle. The system may display video images derived from image data captured by the undercarriage cameras to assist the driver in seeing obstacles or rough terrain or the like during a driving maneuver of the vehicle. Optionally, the system may merge or stitch image data captured by one or more undercarriage cameras with image data captured by one or more surround view cameras to provide enhanced display of the area at and around the vehicle to assist the driver in maneuvering the vehicle, such as during a reversing or parking maneuver. Optionally, the system may process image data captured by the undercarriage cameras to detect obstacles or rough terrain or the like, and may generate an alert to the driver (or may control the steering and/or braking of the vehicle) so that the vehicle may avoid the detected obstacle or the like.

The vision system may include a display for displaying images captured by one or more of the exterior (forward, rearward, sideward) viewing cameras and/or one or more of the undercarriage cameras for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may utilize aspects of the trailering systems described in U.S. Pat. No. 9,085,261 and/or 6,690,268, and/or U.S. Publication Nos. US-2017-0254873; US-2017-0217372; US-2017-0050672; US-2015-0217693; US-2014-0160276; US-2014-0085472 and/or US-2015-0002670, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:

an underbody camera disposed at an underside of a vehicle and having a field of view encompassing a ground surface under the vehicle and being traveled on by the vehicle, said underbody camera capturing image data as the vehicle is moving;

a control comprising an image processor that processes image data captured by said underbody camera;

wherein said control is operable to detect an object under the vehicle that is greater than a threshold height via processing of image data captured by said underbody camera;

wherein one selected from the group consisting of (i) said underbody camera has a principal axis of the field of view directed at least in a forward direction of travel of the vehicle and said control, responsive to processing of image data captured by said underbody camera, determines presence of an object forward of said underbody camera and having height greater than the threshold height, and (ii) said underbody camera has a principal axis of the field of view directed at least rearward and said control, responsive to processing of image data captured by said underbody camera, determines presence of an object rearward of said underbody camera and having height greater than the threshold height; and wherein said control, responsive to determination of presence of the object under the vehicle that has height greater than the threshold height, generates an output to inform a driver of the vehicle of the detected object under the vehicle.

2. The vision system of claim 1, wherein said underbody camera is disposed along a longitudinal centerline of the vehicle and rearward of the front wheels of the vehicle and forward of the rear wheels of the vehicle.

3. The vision system of claim 1, wherein the detected object under the vehicle comprises an object that has a height greater than a predetermined threshold height.

4. The vision system of claim 1, wherein the detected object is part of rough terrain under the vehicle where the ground surface has a height change greater than a predetermined threshold height over a predetermined distance.

5. The vision system of claim 1, comprising a display device disposed in the vehicle and viewable by a driver of the vehicle, wherein said display device, responsive at least in part to the generated output, displays images derived from image data captured by said underbody camera.

6. The vision system of claim 5, wherein said display device displays images derived from image data captured by said underbody camera responsive at least in part to a user input.

7. The vision system of claim 6, comprising a plurality of surround view cameras disposed at the vehicle and having respective sideward and/or rearward fields of view sideward and/or rearward of the vehicle.

8. The vision system of claim 7, wherein said vision system merges image data captured by said underbody camera with image data captured by at least one of said surround view cameras, and wherein said display device displays composite images derived from the merged image data.

9. The vision system of claim 5, wherein said display device displays images derived from image data captured by said underbody camera responsive to detection, via processing of image data captured by said underbody camera, of the object under the vehicle.

10. The vision system of claim 1, comprising a plurality of underbody cameras disposed at the underside of the vehicle, wherein image data captured by said plurality of underbody cameras are processed at said control, and wherein said control, responsive to processing of image data captured by said plurality of underbody cameras, detects an object under the vehicle that is greater than the threshold height.

11. The vision system of claim 1, comprising at least one under-trailer camera disposed at an underside of a trailer and having a field of view underneath the trailer, wherein, when the trailer is hitched to the vehicle, said control, responsive to processing of image data captured by said under-trailer camera, detects an object under the trailer that is greater than a threshold size, and wherein said control, responsive to detection of the object under the trailer, generates an output to inform the driver of the vehicle of the detected object under the trailer.

12. The vision system of claim 11, comprising a display device disposed in the vehicle and viewable by a driver of the vehicle, wherein, responsive at least in part to detection of the object under the trailer, said display device displays images derived from image data captured by said under-trailer camera.

13. A vision system for a vehicle, said vision system comprising:
an underbody camera disposed along a longitudinal centerline of the vehicle and rearward of front wheels of the vehicle and forward of rear wheels of the vehicle, said underbody camera capturing image data as the vehicle is moving;
a control disposed at the vehicle and having an image processor that processes image data captured by said underbody camera;
wherein said underbody camera has a field of view at least downward and forward underneath the vehicle encompassing a ground surface under the vehicle and being traveled on by the vehicle and encompassing at least a portion of front tires of the vehicle, said underbody camera capturing image data as the vehicle is moving;
wherein said underbody camera has a principal axis of the field of view directed in a forward direction;
a display device disposed in the vehicle and viewable by a driver of the vehicle, wherein said display device is operable to display video images derived from image data captured by said underbody camera;
wherein said control, responsive to processing of image data captured by said underbody camera, determines presence of an object forward of said underbody camera and having height greater than a threshold height;
wherein said display device displays images derived from image data captured by said underbody camera responsive at least in part to actuation of a user input in the vehicle; and
wherein said display device displays images derived from image data captured by said underbody camera responsive at least in part to determination, via processing of image data captured by said underbody camera, of presence of the object under the vehicle.

14. The vision system of claim 13, wherein said control, responsive to detection of the object under the vehicle, generates an output to inform a driver of the vehicle of the detected object under the vehicle.

15. A vision system for a vehicle, said vision system comprising:
a first underbody camera disposed along a longitudinal centerline of the vehicle and rearward of front wheels of the vehicle and forward of rear wheels of the vehicle;
wherein said first underbody camera has a field of view at least forward underneath the vehicle encompassing a ground surface under the vehicle and being traveled on by the vehicle and encompassing at least a portion of front tires of the vehicle, said first underbody camera capturing image data as the vehicle is moving;
wherein said first underbody camera has a principal axis of the field of view directed in a forward direction;
a second underbody camera disposed along the longitudinal centerline of the vehicle and rearward of the front wheels of the vehicle and forward of the rear wheels of the vehicle;
wherein said second underbody camera has a field of view at least rearward underneath the vehicle encompassing the ground surface under the vehicle and being traveled on by the vehicle and encompassing at least a portion of rear tires of the vehicle, said second underbody camera capturing image data as the vehicle is moving;
wherein said second underbody camera has a principal axis of the field of view directed in a rearward direction;
a control disposed at the vehicle and having an image processor that processes image data captured by said first and second underbody cameras;
wherein said control, responsive to processing of image data captured by said first underbody camera and/or said second underbody camera, detects an object that is present in the field of view of said first underbody camera and/or said second underbody camera and that has height greater than a threshold height; and
wherein said control, responsive to detection of the object under the vehicle that has height greater than the threshold height, generates an output to inform a driver of the vehicle of the detected object.

16. The vision system of claim 15, comprising a display device disposed in the vehicle and viewable by the driver of the vehicle, wherein said display device displays images derived from image data captured by said first underbody camera and/or said second underbody camera.

17. The vision system of claim 16, wherein said display device displays images derived from image data captured by said first underbody camera and/or said second underbody camera responsive at least in part to detection, via processing of image data captured by said first underbody camera and/or said second underbody camera, of the object.

18. The vision system of claim 16, wherein said display device displays images derived from image data captured by said first underbody camera and/or said second underbody camera responsive at least in part to actuation of a user input in the vehicle.

* * * * *